United States Patent [19]

Lombard et al.

[11] Patent Number: 4,594,893
[45] Date of Patent: Jun. 17, 1986

[54] PROBE FOR MEASURING THE LEVEL OF LIQUID IN A TANK OR PIPE

[75] Inventors: Claude Lombard, Le Chesnay; Michel Warenghem, Suresnes, both of France

[73] Assignee: Regie Nationale des Usines Renault, Boulogne-Billancourt, France

[21] Appl. No.: 636,630

[22] Filed: Aug. 1, 1984

[30] Foreign Application Priority Data

Aug. 3, 1983 [FR] France ................ 83 12775

[51] Int. Cl.$^4$ .............................. G01F 23/26
[52] U.S. Cl. .................... 73/304 C; 324/61 P; 361/284
[58] Field of Search ............ 73/304 C; 361/284

[56] References Cited

U.S. PATENT DOCUMENTS

| | | | |
|---|---|---|---|
| 2,700,901 | 2/1955 | Rickner | 73/304 C |
| 2,710,541 | 6/1955 | Miller | 73/304 C |
| 2,760,372 | 8/1956 | Storm | 73/304 C X |
| 2,769,338 | 11/1956 | Hermanson | 73/304 C |
| 2,998,559 | 8/1961 | Smith | 73/304 C X |
| 3,958,159 | 5/1976 | Rauchwerger | 73/304 C X |
| 3,991,614 | 11/1976 | Ditzler | 73/304 C X |
| 4,038,871 | 8/1977 | Edwards | 73/304 C |
| 4,145,927 | 3/1979 | Larson | 73/304 C |
| 4,295,370 | 10/1981 | Bristol | 361/284 X |
| 4,296,630 | 10/1981 | Jung et al. | 361/284 X |

FOREIGN PATENT DOCUMENTS

| | | | |
|---|---|---|---|
| 0220669 | 11/1957 | Australia | 361/284 |
| 2451024 | 3/1980 | France . | |

Primary Examiner—Daniel M. Yasich
Attorney, Agent, or Firm—Oblon, Fisher, Spivak, McClelland & Maier

[57] ABSTRACT

The capacitor probe is made up of two parts, both of which are in fluid communication with the interior of the tank or pipe the liquid level of which is to be measured. One part (7) of the probe is located at the bottom of the probe and acts as a reference capacitor. The other part (4) of the probe extends upwardly to the maximum liquid level to be measured. The part (4) includes two identical measuring capacitors, one of which is connected to the reference capacitor.

43 Claims, 13 Drawing Figures

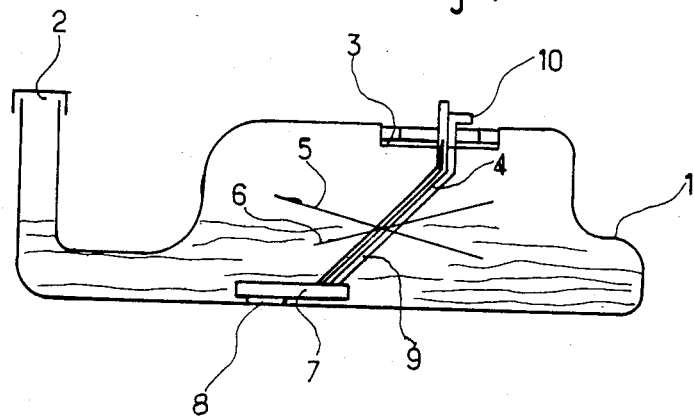
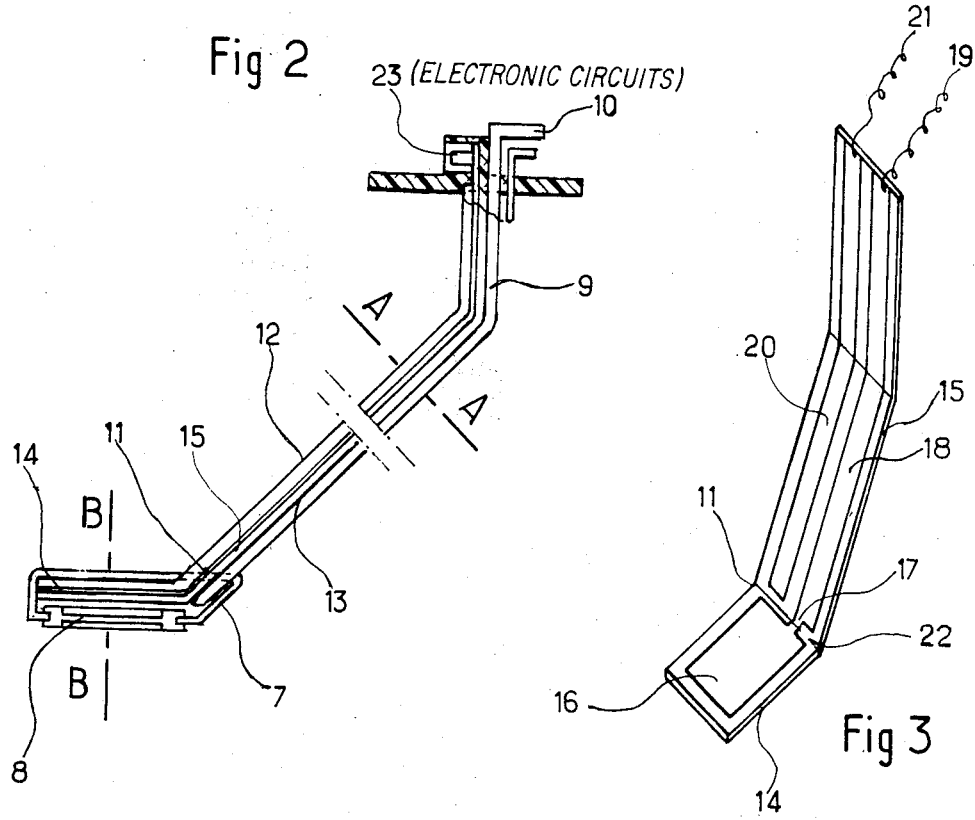

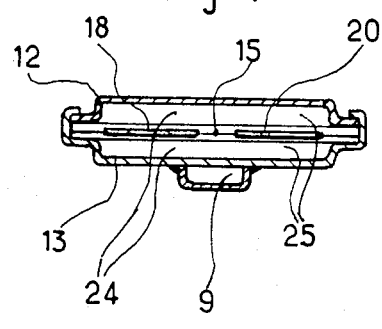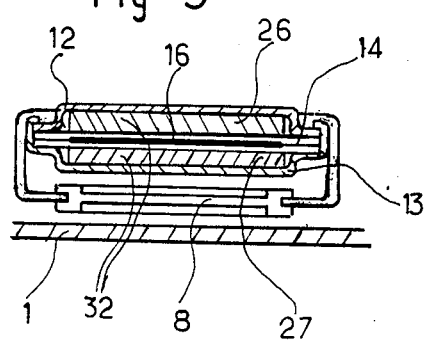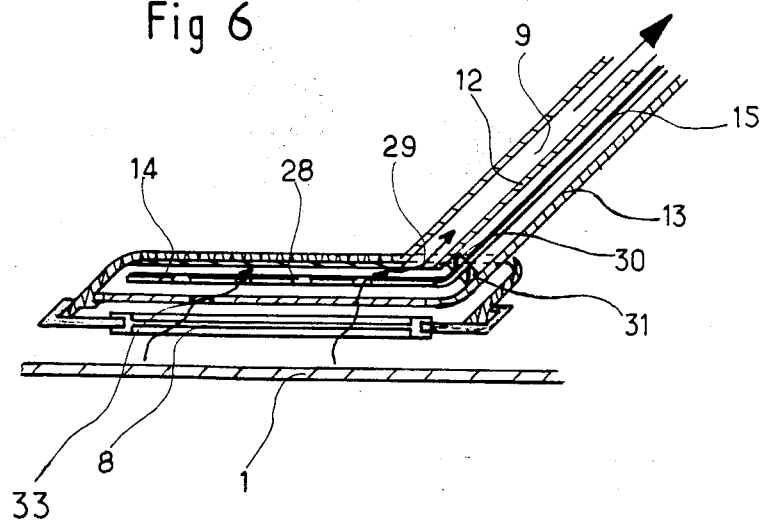

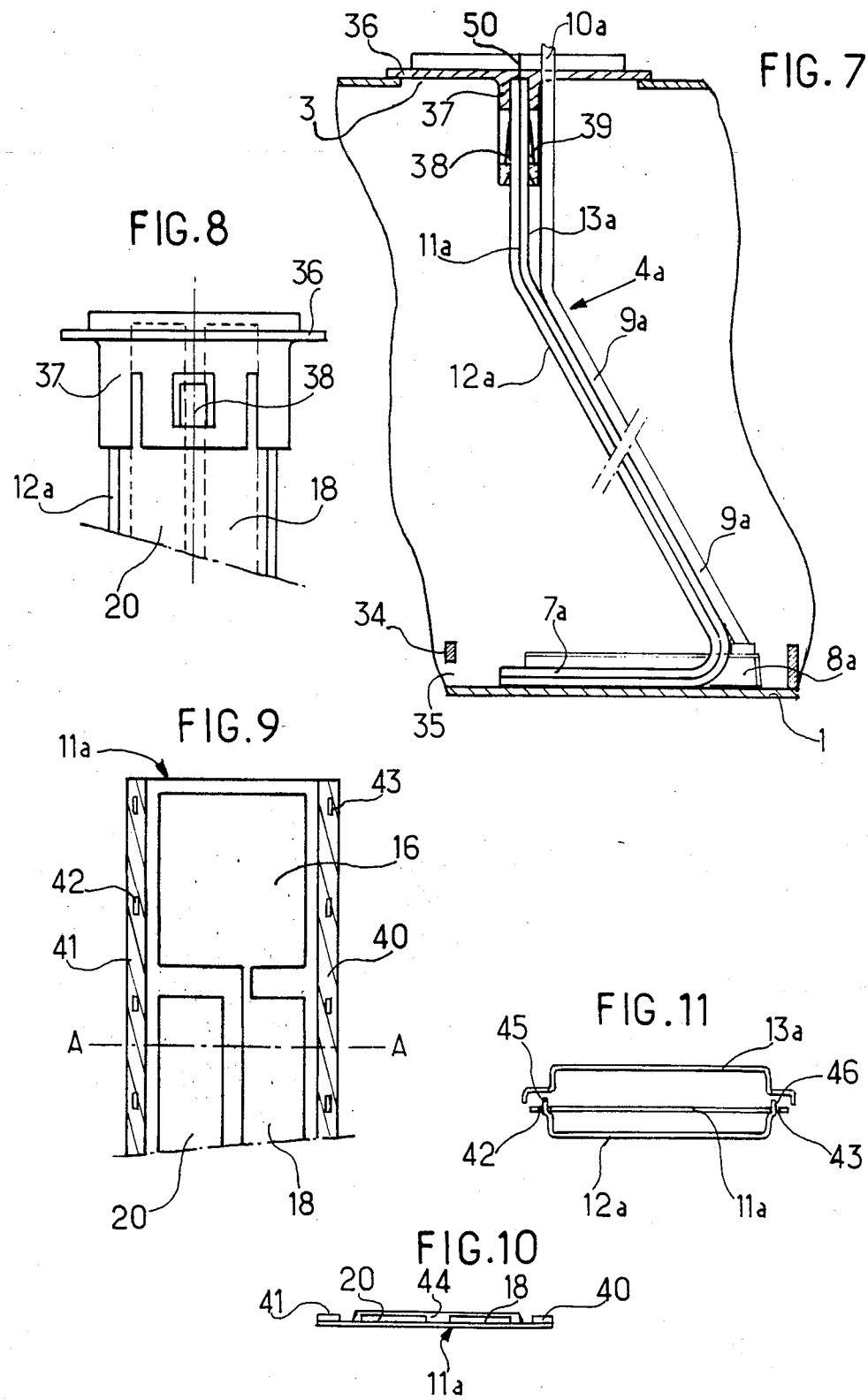

PROBE FOR MEASURING THE LEVEL OF LIQUID IN A TANK OR PIPE

This invention has as its object a device for measuring the level of liquid, particularly of fuel in the tanks of motor vehicles or machines.

Numerous probes of this type, based on very diverse physical principles, are known. The most widely used probe uses the movement of a float on the surface of the liquid to move the wiper of a potentiometer, the value of the voltage collected being representative of the level.

A certain number of embodiments have been based on the difference of dielectric constant between the air and the liquid to be measured. For this purpose, the measuring probe takes the form of a capacitor with plane or concentric plates between which there is air when the tank is empty or liquid when the tank is full.

In the case of insulating liquids, the functioning of such embodiments is satisfactory. That is not the case, however, when the nature of the liquid varies, causing a change in the corresponding dielectric constant and, still more, when the liquid is more or less conductive, the measurement then being false or delicate. This is particularly the case for water and hydrophilic liquids such as alcohols or liquids containing hydrocarbons.

Consideration has been given to using a reference electrode to eliminate the problems of variation of the dielectric constant with temperature, particularly by immersing it in a hydrocarbon type liquid in a separate tank.

The French Pat. No. FR-A-2451024 describes such a capacitive probe for measuring the level of liquid in a tank comprising an upper part serving for measuring the level of liquid and a lower part, always immersed in the liquid to be measured, serving as a reference capacitor, the two parts freely communicating with the liquid to be measured by orifices provided for this purpose.

The foregoing patent contributes some solutions to various problems encountered, particularly to the change in the nature of the liquid, to its variations in conductivity, to its variations of dielectric constant with temperature, to the grade at times tortuous which corresponds to the slighest variations of the indications of the device when the inclination of the tank varies under the effect of the grade of the road in case of a motor vehicle or even if it has at least one wheel on the sidewalk.

However, in the probe according to the French Pat. No. FR-A-2451024 dated Mar. 10, 1980, placing of the compensating electrode in the suction channel in practice requires an electric pump, which is started before the engine is started, for this electrode to be bathed by the liquid whose level is to be measured. Further, the comb-shaped electrodes increases the risk of electric leakage of the capacitors and do not assure outside shielding of the measuring device that is essential to resist outside disturbances and avoid creating such disturbances.

The invention aims at providing a capacitive level measuring probe which makes it possible to avoid these drawbacks, while being of a design and allowing calculation of volumes that are simpler than in the solution of the prior art cited.

For this purpose, the invention has as its object a capacitive probe for measuring the level of liquid in a tank comprising an upper part serving to measure the level of liquid and a lower part, always immersed in the liquid to be measured, serving as a reference capacitor, the two parts freely communicating with the liquid to be measured by orifices provided for this purpose, characterized in that the upper part consists of two parallel measuring capacitors identical in length and of the same capacitance $C_2$, $C_3$ and in that reference capacitance $C_1$ has one of its plates connected to a plate of one of the two measuring capacitors of capacitance $C_2$ and with the latter form a capacitance unit $C_1+C_2$.

Thanks to this arrangement, the value of the liquid level will therefore be known by comparison between the value of reference capacitance $C_1$ equal to the difference $(C_1+C_2)-C_3$ and the value of level measuring capacitance $C_3$.

The perfect symmetry of all the constitutive elements makes it possible to eliminate the problems of expansion of the probe and variation of dielectric constants with ambient temperature, particularly that of the liquid to be measured.

The invention will now be described with reference to the accompanying drawings, without their limiting the scope of the invention:

FIG. 1 is a view in section of a probe placed in a fuel tank;

FIG. 2 is an enlarged view in section of said probe;

FIG. 3 is a perspective view of the central part of the probe, showing the arrangement of the central plates of the capacitors, after removal of one of the auxiliary thin dielectrics which electrically insulate these plates from the liquid to be measured;

FIG. 4 is a view in section along line AA of FIG. 2 showing the two capacitors that serve to measure the level;

FIG. 5 is a view in section along line BB of FIG. 2, which shows the reference capacitor and the fuel suction strainer;

FIG. 6 is a view similar to FIG. 2 of a variant embodiment in which feeding of the fuel is performed through the reference capacitor which, for this purpose, is pierced with fluid passage holes;

Figure 12:
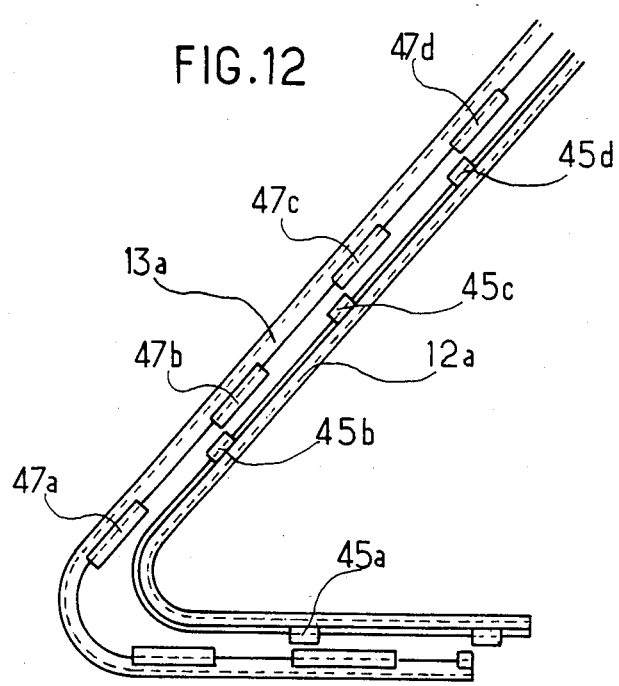

FIGS. 7 to 12 correspond to a preferred embodiment and particularly,

FIG. 7 is a view in section of a level probe similar to that of FIG. 2, the reference capacitor being bent in the opposite direction to occupy less space and the outside being snapped in a piece of plastic acting as a plug on the tank access hole;

FIG. 8 is a front view of the snapping of the plate on the plastic piece;

FIG. 9 is a partial front view of the central plates of the probe showing the auxiliary metallizations for contact with the outside plate and fastening holes;

FIG. 10 is a detail view in section along line A—A of FIG. 9 showing the central plates of FIG. 9;

FIG. 11 is a view in cross section of the outside plates showing the hooks for holding the central plates;

FIG. 12 is a lateral elevation view of the outside plates before fitting; and

Figure 13:
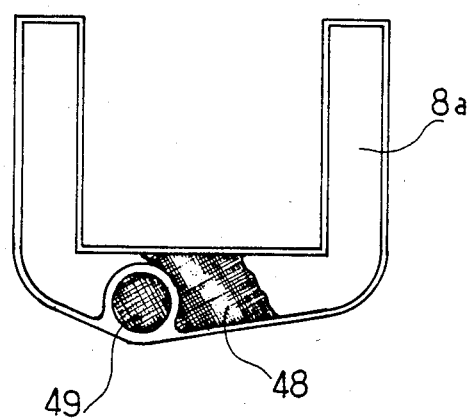

FIG. 13 is a partially exploded top view of the suction strainer shown in FIG. 7.

FIG. 1 shows a fuel tank 1 having a filling orifice 2 and a probe hole 3 receiving level probe 4. The shape of this probe is selected so that it goes through the points of intersection of lines such as 5 and 6 corresponding to the level of liquid for two equal opposite inclinations of the tank.

The probe contained in a housing has a lower part 7 forming the reference capacitor and which also carries suction strainer 8 extended by a pipe 9 coming out at 10 on the outside of the tank.

FIG. 2, which is more detailed, shows a long flat electric circuit 11, electrically insulated on its surface and running along the entire length of the probe, enclosed between two metal plates 12 and 13 in the upper part of the housing which are in galvanic contact with the liquid to be measured. These plates 12 and 13 can be electrically insulated from the liquid if necessary.

Lower part 14 of circuit 11 constitutes, with plates 12 and 13, the reference capacitor, while upper part 15 of circuit 11 constitutes the level measuring capacitors.

Suction of the fuel through strainer 8 does not go through the reference capacitor but directly into pipe 9. Circuit 11 and the plates 12 and 13 are electrically connected to electronic circuits 23 assuring the calculation of the filling level.

FIG. 3 shows, in lower part 14, a flat metal electrode 16 connected by a fine conductor 17 to a metal strip 18 going to the outside as an output 19. A metal strip 20 of the same dimensions as strip 18 goes out of the apparatus as an output 21.

Strips 18 and 20 are separated from metal electrode 16 by a small space 22.

Section AA of FIG. 2, represented in FIG. 4, shows suction pipe 9 and metal plates 12 and 13 clamped and electrically connected to one another. Upper part 15 of flat circuit 11, with its two metal strips 18 and 20 forming the inside plates, constitutes, with the metal plates 12, 13 forming the outside plates, double-face capacitors 24 and 25 whose dielectric can be either air or liquid. These metal strips 18 and 20 are electrically insulated by a nonwetting solid thin dielectric such as a fluoro resin or a polyethylene derivative, while plates 12 and 13 cannot be insulated.

Section BB of FIG. 2, represented in FIG. 5, shows the suction strainer 8 near the bottom of tank 1. Part 14 of flat circuit 11 encloses only a single metal electrode 16 forming an inside plate and, with the plates 12 and 13 forming outside plates, constitutes a single double-face reference capacitor 32. The interplate space of capacitor 32 can be filled with a porous absorbent product 26, 27 acting as a reserve when tank 1 is almost empty, for example, absorbent fibers.

FIG. 6 shows a variant embodiment of lower part 7 of the probe in which the liquid from the tank is sucked through the reference capacitor by orifices 33, 28, 29 in plates 13, 14, 12 to pipe 9.

Plugs 30 and 31 prevent suction from occurring between plates 12 and 13 in case the strainer is clogged, which would falsify the measurement.

The functioning of the device is based on the difference of dielectric constant between the liquid to be measured and the ambient air.

Reference capacitor 32 is always filled with liquid either by capillary action in the case of FIG. 5 or by suction of the liquid in the case of FIG. 6. Its value depends on the nature of the liquid, the spacing of the plates and the temperature. Under determined conditions, it has a certain value $C_1$.

The capacitance of capacitors 24 and 25 futher depends on the level of the liquid in probe 4. Under determined conditions, the value of the corresponding capacitances is $C_2$ and $C_3$. Measurement of these values by a process, not described, is in the domain of a person skilled in the art and can easily be provided by electronic integrated circuits or equipment available on the market.

Capacitance $C_1$ is not known directly since the electric output 19 gives access only to the unit of capacitors 16 and 18, or the sum of $C_1$ and $C_2$. On the other hand, $C_3$ is directly accessible by output 21.

The value $C_1$ is simply the difference $(C_1+C_2)-C_3$ since, by design, $C_2$ and $C_3$ have the same value.

The value of the liquid level results from the comparison of the value of $C_3$, capacitance of the measuring capacitor, and the value of $C_1$, capacitance of the reference capacitor. If stray capacitances are weak, it suffices for making the relation. If these stray capacitances are not negligible, they must be deduced first. Since $C_1$, $C_2$, $C_3$ vary in the same proportions with the nature of the liquid and temperature, the device is, therefore, self-compensating.

The FIG. 6 variant embodiment which would consist in putting a very thick gaseous or solid insulator around conductor 18, which could be filamentary to reduce its capacitance in relation to plates 12 and 13, runs into practical difficulties and the advantage of the simplicity of embodiment is lost.

The various plates can have any shape. The shape can particularly be tubular by use of a wound flexible printed circuit, without going outside the scope of the invention.

The embodiment described above can be improved to facilitate mass production, assembly and installation on the vehicle. There are actually a great number of types of vehicle tanks and it is advantageous to be able to start within standard elements made in strips to be bent and cut in pieces at the last moment before production of a determined model. FIGS. 7 to 12 correspond to such an embodiment.

Taking in detail the view in section of the lower part 7a of the probe in FIG. 7, the tank carries the same reference 1 with its probe hole 3 as in FIG. 1.

Metal plates 12a and 13a which constitute the outside plate of capacitors $C_1$, $C_2$, $C_3$ are bent downward at more than 270°, forming an acute angle to reduce the speed occupied by the probe and to allow suction strainer 8a to occupy a place in bowl 34 placed at the bottom of the tank and provided with communication holes 35.

This bowl prevents misgauging during turning; suction pipe 9a of strainer 8a comes out on the inside of 10a. It goes through plastic closing plate 36 which, toward the inside of tank 1, carries a projection 37 on the inside of which metal plates 12a and 13a are snapped thanks to stamped out elastic tongues 38 and 39; these tongues are placed in the corresponding cavities of projection 37.

Semiflexible flat strip 11a, which carries inside plates 16, 18, 20, is clamped between outside plates 12a and 13a. It goes to the outside of the tank at 50.

FIG. 8 is a front view of the top of the level probe, seen from the side opposite suction pipe 9a. It carries th same references as FIG. 7.

FIG. 9 is a partial front view of flat strip 11a which carries inside plates 16, 18, 20 corresponding to capacitors $C_1$, $C_2$, $C_3$. These plates are insulated from the liquid. Two metal strips 40 and 41, located on the edge of strip 11a are not insulated (as may be seen in FIG. 10) the insulating product 44 covering only the central part of flat circuit 11a.

Strips 40 and 41 serve to provide contact between the outside of tank 1 at 50 and metal plates 12a and 13a which are embedded in plastic projection 37 and which, without this arrangement, would not be accessible from the outside at 50.

Perforations 42, 43, placed at regular intervals on the edge of flat circuit 11a, serve to index this flat circuit in length and stretch it in width.

Machines for perforating motion picture films are suitable for this application.

FIG. 11 is a view in section of the probe showing strip 11a stretched and indexed by teeth 45 and 46 of metal plate 12a and going into holes 42 and 43 of flat circuit 11a.

Teeth 45a to 45d, shown in FIG. 12, are inserted, during assembly, between wider teeth 47a to 47d of metal plate 13a which are then crimped on plate 12a and flat strip 11a.

The respective dimensions of teeth 45(a-d) and 47(a-d) are selected to allow assembly and crimping of teeth 47(a-d), despite the folding of the plates.

FIG. 13 is a partially exploded top view of a suction strainer 8a, showing suction screen 48 of the strainer. The suction strainer 8a is U-shaped, and the suction screen 48 occupies the bottom of the 4. The suction strainer 8a has a suction connection 49 into which suction pipe 9a goes.

The functioning is completely identical with that of the probes described in the preceding figures.

Metal plates 12a and 13a can be replaced by plastic pieces metallized by chemical or electrolytic deposit or even by painting a coating with a base of nickel powder by gun.

Strip 11a can be provided, for the longer length used, with metal strips 18 and 20 constituting inside plates cut to the length used.

Metal plates 12a and 13a and flat strip 11a can be produced in the form of a continuous strip on a high-speed machine, then cut to the desired length and formed on a simple machine for a specific use.

We claim:

1. A capacitive probe for measuring the level of liquid in a tank, said capacitive probe comprising a housing containing an upper part serving to measure the level of liquid and a connected lower part which, during use of the probe, is always immersed in the liquid to be measured, serving as a reference capacitor, the two parts freely communicating with the liquid to be measured by at least one orifice provided in the housing for this purpose, the upper part comprising two spaced, parallel measuring capacitors identical in length and having identical capacitances ($C_2$, $C_3$), the reference capacitor having capacitance ($C_1$) and having two plates, one of which is electrically connected to a plate of one of the two measuring capacitors and, with said one of the two measuring capacitors, forming a unit of capacitance of the sum of the capacitances ($C_1+C_2$) of the reference capacitor and said one of the two measuring capacitors.

2. A capacitive probe according to claim 1, and further comprising means for insulating at least one of the plates of each of the capacitors from the liquid to be measured, said means comprising a thin coating of a non-wetting solid dielectric material coated on said at least one of the plates, said means being sized, shaped, and positioned, in regard to the other plate of each of the capacitors, so as to provide sufficient space for passage of air or liquid.

3. A capactive probe according to claim 2, wherein the non-wetting dielectric material is a fluoro resin or a polyethylene derivative.

4. A capacitive probe according to claim 1, wherein the interplate space of the reference capacitor is filled with absorbent fibers which, during use of the probe, are wetted by the liquid.

5. A capacitive probe according to claim 1 and further comprising a suction strainer positioned so that, during use of the probe, the liquid passes through said suction strainer into the lower part of the probe.

6. A capactive probe according to claim 5, wherein the suction strainer for the liquid shaped into the form of a U and surrounds the lower part of the probe on the three sides, and wherein a filtering screen is provided in the lower part of the U.

7. A capacitive probe according to claim 8, wherein there are provided in the various constitutive parts of the reference capacitor orifices allowing the passage of the liquid from the strainer to a suction pipe, and further comprising plugging means for avoiding suction of liquid contained in the upper part of the probe.

8. A capacitive probe according to claim 1, wherein electronic processing circuits are provided at the outlet of the probe on the outside of the tank.

9. A capacitive probe according to claim 1, wherein each of the two parallel measurings capacitors comprises an inside plate and two outside plates, the inside plates of each of the inside two parallel measuring capacitors being disposed on a flat strip which on its edges has perforations in which teeth, carried by at least one of the two outside plates of the associated one of the two parallel measuring capacitors, penetrate to position and stretch said flat strip.

10. A capacitive probe according to claim 9, wherein the two outside plates, with the aid of at least one tongue, are snapped on the inside of a projection on a closing plate of a probe hole in the tank.

11. A capacitive probe according to claim 10, wherein said flat strip has, on its edges, electrically conductive strips, which are in electrical contact with the outside plates.

12. A capacitive probe according to claim 1, wherein the lower part of the probe forms an acute angle with the upper part of the probe, said lower part being parallel to the bottom of the tank.

13. A capacitive probe according to claim 1, wherein only one of the plates of each of the capacitors is insulated from the liquid to be measured.

14. A capactive probe according to claim 1, wherein the outside plates of the capacitors are made of a plastic material metallized on the surfaces facing the inside of the capacitors with a paint containing a metal powder.

15. A capacitive probe according to claim 1, wherein only one of the plates of each of the capacitors is insulated from the liquid to be measured.

16. A capacitive probe for measuring the level of a liquid in a tank, said probe comprising:

(a) a lower part which, during use of the probe, is always immersed in the liquid the level of which is to be measured, said lower part comprising a reference capacitor composed of two spaced plates and having a capacitance ($C_1$), and (b) an upper part connected to said lower part, said upper part comprising two parallel measuring capacitors which, during use of the probe, are exposed to the liquid the level of which is to be measured, each of said two spaced, parallel measuring capacitors being composed of two spaced plates and having capacitances ($C_2$) and ($C_3$), respectively, said two parallel measuring capacitors being identical in length, having the same capacitance, and being positioned so that each is exposed to the same depth to the liquid the level of which is to be measured, one of said two parallel two measuring capacitors having one of its plates electrically connected to one of the plates of said reference capacitor, whereby said reference capacitor and said one of said two parallel measuring capacitors form a unit having a capacitance equal to $(C_1)+(C_2)$.

17. A capacitive probe for measuring the level of liquid in a tank, said capacitive probe comprising:

(a) a housing containing an upper part serving to measure the level of liquid and a connected lower part which, during use of the probe, is always immersed in the liquid to be measured, serving as a reference capacitor, the two parts freely communicating with the liquid to be measured by at least one orifice provided in the housing for this purpose, the upper part comprising two spaced, parallel measuring capacitors identical in length and having identical capacitances ($C_2$, $C_3$), the reference capacitor having capacitance ($C_1$) and having two plates, one of which is electrically connected to a plate of one of the two measuring capacitors and, with said one of the two measuring capacitors, forming a unit of capacitance of the sum of the capitances ($C_1+C_2$) of the reference capacitor and said one of the two remaining capicitors, and (b) means for insulating at least one of the plates of each of the capacitors from the liquid to be measured, said means comprising a thin coating of a non-wetting solid dielectric material coated on said at least one of the plates, said means being sized, shaped, and positioned, in regard to the other plate of each of the capacitors, so as to provide sufficient space for passage of air or liquid, the dielectric of the two parallel measuring capacitors being formed partly by said coating of said dielectric material and party by air and/or the liquid to be measured, depending upon the level of the liquid.

18. A capacitive probe according to claim 17, wherein the outside plates of the capacitors are made of a plastic material metallized on the surfaces facing the inside plates of the capacitors with a paint containing a metal powder.

19. A capacitive probe according to claim 17, wherein the insulated plate of one of the two parallel measuring capacitors and the insulated plate of the reference capacitor are electrically connected.

20. A capacitive probe according to claim 17, wherein the non-wetting dielectric material is a fluoro resin or a polyethylene derivative.

21. A capactive probe according to claim 17, wherein the interplate space of the reference capacitor is filled with absorbent fillers which, during use of the probe, are wetted by the liquid.

22. A capacitive probe according to claim 17 and further comprising a suction strainer positioned so that, during use of the probe, the liquid passes through said suction strainer into the lower part of the probe.

23. A capacitive probe according to claim 22, wherein the suction strainer for the liquid is U-shaped and surrounds the lower part of the probe on three sides, and wherein a filtering screen is provided in the lower part of the U.

24. A capacitive probe according to claim 17, wherein there are provided in the various constitutive parts of the reference capacitor orifices allowing the passage of the liquid from the strainer to a suction pipe, and further comprising plugging means for avoiding suction of liquid contained in the upper part of the probe.

25. A capacitive probe according to claim 17, wherein electronic processing circuits are provided at the outlet of the probe on the outside of the tank.

26. A capacitive probe according to claim 17, wherein each of the two parallel measurings capacitors comprises an inside plate and two outside plates, the inside plates of each of the inside two parallel measuring capacitors being disposed on a flat strip which on its edges has perforations in which teeth, carried by at least one of the two outside plates of the associated one of the two parallel measuring capacitors, penetrate to position and stretch said flat strip.

27. A capacitive probe according to claim 17, wherein the two outside plates, with the aid of at least one tongue, are snapped on the inside of a projection on a closing plate of a probe hole in the tank.

28. A capacitive probe according to claim 17, wherein said flat strip has, on its edges, electrically conductive strips, which are in electrical contact with the outside plates.

29. A capacitive probe according to claim 17, wherein the lower part of the probe forms an acute angle with the upper part of the probe, said lower part being parallel to the bottom of the tank.

30. A capacitive probe for measuring the level of liquid in a tank, said capacitive probe comprising a housing containing an upper part serving to measure the level of liquid and a connected lower part which, during use of the probe, is always immersed in the liquid to be measured, serving as a reference capacitor, the two parts freely communicating with the liquid to be measured by at least one orifice provided in the housing for this purpose, the upper part comprising two spaced, parallel measuring capacitors identical in length and having identical capacitances ($C_2$, $C_3$), the reference capacitor having capacitance ($C_1$) and having two plates, one of which is electrically connected to a plate of one of the two measuring capacitors and, with said one of the two measuring capacitors, forming a unit of capacitance of the sum of the capacitances ($C_1+C_2$) of the reference capacitor and said one of the measuring capacitors, each of the two parallel measuring capacitors comprising an inside plate and two outside plates, the inside plate of each of the two parallel measuring capacitors being disposed on a flat strip which on its edges has perforations in which teeth, carried by at least one of the two outside plates of the associated one of the two parallel measuring capacitors, penetrate to position and stretch said flat strip, said flat strip having, on its edges, electrically conductive strips which are in electrical contact with the outside plates.

31. A capacitive probe according to claim 30, wherein said outside plates of the capacitors are made of a plastic material metallized on the surfaces facing the inside plates of the capacitors with a paint containing a metal powder.

32. A capacitive probe according to claim 30, and further comprising means for insulating at least one of the plates of each of the capacitors from the liquid to be measured, said means comprising a thin coating of a non-wetting dielectric material coated on said at least one of the plates, said means being sized, shaped, and positioned, in regard to the other plate of each of the capacitors, so as to provide sufficient space for passage of air or liquid.

33. A capacitive probe according to claim 32 wherein the dielectric of the two parallel measuring capacitors is formed partly by said coating of dielectric material and partly by air and/or the liquid to be measured, depending upon the level of the liquid.

34. A capacitive probe according to claim 30, wherein only one of the plates of each of the capacitors is insulated from the liquid to be measured.

35. A capacitive probe according to claim 30, wherein the insulated plate of one of the two parallel measuring capacitors and the insulated plate of the reference capacitor are electrically conducted.

36. A capacitive probe according to claim 30, wherein the non-wetting dielectric material is a fluoro resin or a polyethylene derivative.

37. A capacitive probe according to claim 30, wherein the interplate space of the reference capacitor is filled with absorbent fibers which, during use of the probe, are wetted by the liquid.

38. a capacitive probe according to claim 30 and further comprising a suction strainer positioned so that, during use of the probe, the liquid passes through said suction strainer into the lower part of the probe.

39. A capacitive probe according to claim 38, wherein the suction strainer for the liquid is U-shaped and surrounds the lower part of the probe on three sides, and wherein a filtering screen is provided in the lower part of the U.

40. A capacitive probe according to claim 30, wherein there are provided in the various constitutive parts of the reference capacitor orifices allowing the passage of the liquid from the strainer to a suction pipe, and further comprising plugging means for avoiding suction of liquid contained in the upper part of the probe.

41. A capacitive probe according to claim 30, wherein electronic processing circuits are provided at the outlet of the probe on the outside of the tank.

42. A capacitive probe according to claim 30, wherein the two outside plates, with the aid of at least one tongue, are snapped on the inside of a projection on a closing plate of a probe hole in the tank.

43. A capacitive probe according to claim 30, wherein the lower part of the probe forms an acute angle with the upper part of the probe, said lower part being parallel to the bottom of the tank.

* * * * *